United States Patent
DuBay

(10) Patent No.: US 7,138,153 B2
(45) Date of Patent: Nov. 21, 2006

(54) ADDITIVE PRODUCT, A METHOD OF ALTERING A CHARACTERISTIC OF AN UNPROCESSED HOST FOOD PRODUCT, AND A METHOD OF INCREASING A MARKET VALUE OF AN UNPROCESSED HOST FOOD PRODUCT

(76) Inventor: Robert DuBay, 25 Euclid Ave, Apt. 3B, Hackensack, NJ (US) 07601

( * ) Notice: Subject to any disclaimer, the term of this patent is extended or adjusted under 35 U.S.C. 154(b) by 289 days.

(21) Appl. No.: 10/409,350

(22) Filed: Apr. 7, 2003

(65) Prior Publication Data

US 2004/0197452 A1    Oct. 7, 2004

(51) Int. Cl.
*A23L 1/22*    (2006.01)
(52) U.S. Cl. .................... 426/534; 426/615; 426/650
(58) Field of Classification Search ............... 426/534, 426/615, 650, 270
See application file for complete search history.

(56) References Cited

U.S. PATENT DOCUMENTS

| | | | |
|---|---|---|---|
| 3,660,112 A | | 5/1972 | Kazeniac et al. |
| 3,826,851 A | | 7/1974 | Guadagni et al. |
| 4,242,365 A | | 12/1980 | Numata et al. |
| 4,343,823 A | * | 8/1982 | Todd et al. .................. 426/250 |
| 4,526,798 A | | 7/1985 | Lucarelli, Jr. et al. |
| 4,536,583 A | | 8/1985 | Mookherjee et al. |
| 4,563,359 A | | 1/1986 | Shimizu et al. |
| 4,570,008 A | | 2/1986 | Boden et al. |
| 4,584,128 A | | 4/1986 | Mookherjee et al. |
| 4,620,945 A | | 11/1986 | Mookherjee et al. |
| 5,064,673 A | | 11/1991 | Buttery et al. |
| 5,436,022 A | | 7/1995 | Chiang et al. |
| 6,284,303 B1 | * | 9/2001 | Rowe et al. ................. 426/628 |
| 6,436,452 B1 | | 8/2002 | Deutz et al. |

OTHER PUBLICATIONS

Ashurst, P.R., Ed., Food Flavorings, 1995, Chapter 8, D.C.F. Church, pp. 224-239, Blackie Academic & Professional, London.*
Flavor & Fragrance Specialties. Savory Flavors, Meat & Vegetable Type [online], [retrieved on May 20, 2003]. Retrieved from the Internet:<URL:http://www.4ffs.com/savory.html>.
Flavor & Fragrance Specialties. Tomato Enhancer [online], [retrieved on May 20, 2003]. Retrieved from the Internet:<URL:http://www.4ffs.com/tomato.html>.
Usda Agriculture Research Service. Enzymatic Modification of Tomato Homogenate and Its effect on Volatile Flavor Compounds, Journal of Food Science, (Interpretive Summary & Technical Abstract) [online], [retrieved on May 20, 2003]. Retrieved from the Internet:<URL:http://www.nps.ars.usda.gov/publications/publications.htm>.
Karp, "An Orange Whose Season Has Come," The New York Times, Jan. 22, 2003, http://www.nytimes.com, (last visited Jan. 23, 2003).

* cited by examiner

*Primary Examiner*—Leslie Wong
(74) *Attorney, Agent, or Firm*—Kenyon & Kenyon LLP

(57) ABSTRACT

A method and additive product to alter a perception of an unprocessed host food product is described, in which a flavor component adapted to impart a flavor of the unprocessed host food product is applied to the unprocessed host food product, and an aroma component adapted to impart an aroma of the unprocessed host food product is applied to the unprocessed host food product.

30 Claims, 8 Drawing Sheets

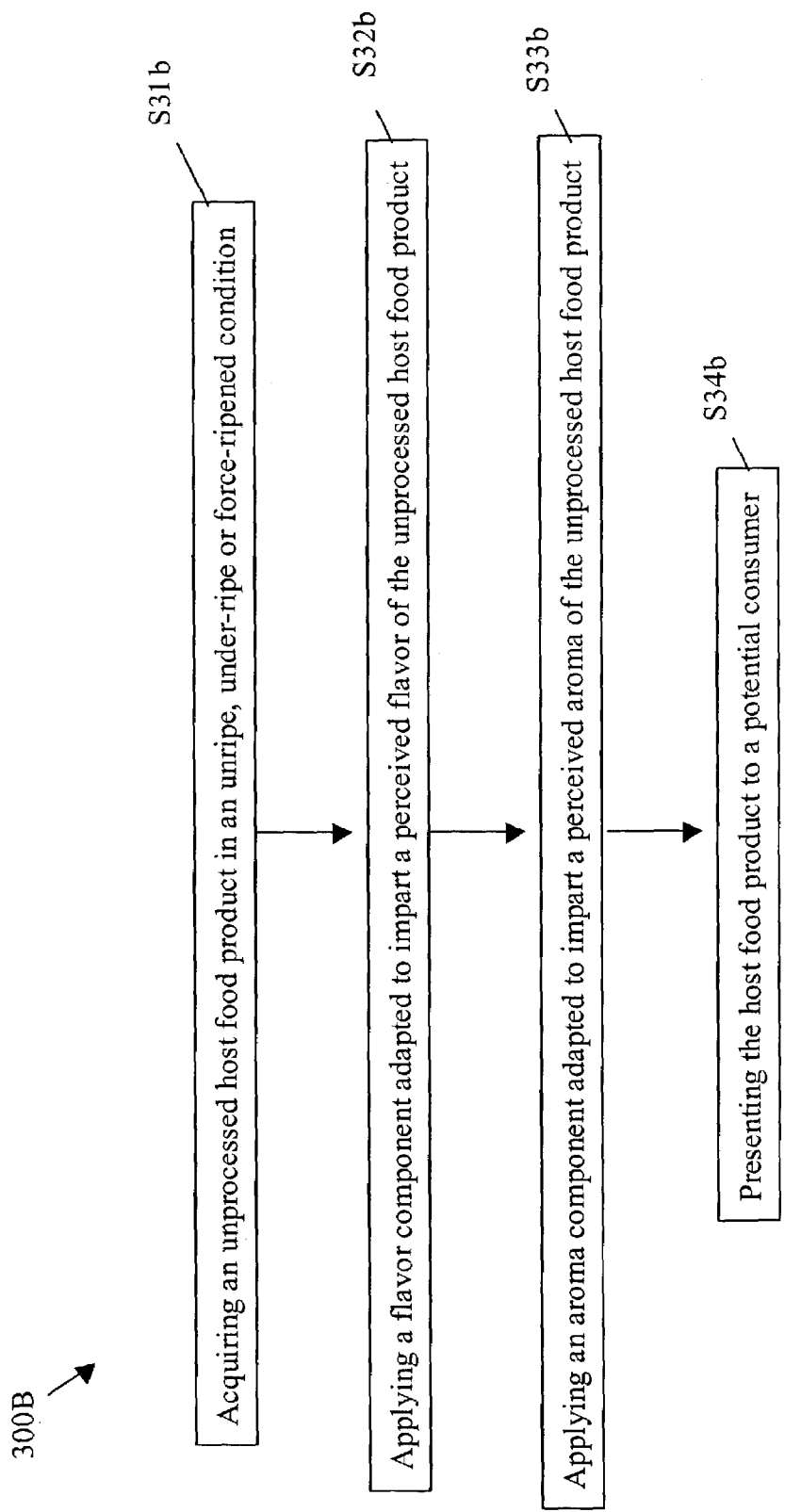

ADDITIVE PRODUCT, A METHOD OF ALTERING A CHARACTERISTIC OF AN UNPROCESSED HOST FOOD PRODUCT, AND A METHOD OF INCREASING A MARKET VALUE OF AN UNPROCESSED HOST FOOD PRODUCT

FIELD OF THE INVENTION

The present invention relates to an additive product, a method of altering characteristics and/or perceived characteristics, such as flavor, aroma, vitamins, nutrients, moisture, and/or color, of an unprocessed host food product, including, for example, a tomato or a tomato-based product, and a method of increasing a market value of an unprocessed host food product.

BACKGROUND INFORMATION

Fruits and/or vegetables that are harvested fully ripened for mass market may deteriorate or risk damage before reaching the grocery shelf. Therefore, growers may the pick the fruits and/or vegetables, such as, for example, tomatoes when they are not fully ripe (e.g., when the tomatoes are green) in an effort to ensure that the harvested tomatoes ship well. Thus, the force-ripened (ripened off the plant or vine) tomatoes available in supermarkets and retail establishments may be undesirably hard, bland, and tasteless as compared to fully-vine-ripened tomatoes. Furthermore, tomatoes that are picked prior to achieving a fully ripen stage on the vine may not contain the same amounts of lycopene, nutrients, and vitamins as vine-ripened tomatoes.

In addition to tomatoes, other fresh produce may be harvested prior to achieving a fully ripened stage and therefore may also be tasteless and/or nutritionally deficient. Accordingly, a method or product to address unripe, under-ripe, or force-ripened produce may have widespread application.

SUMMARY

An exemplary method and/or exemplary product according to the present invention may include an additive, such as, for example, a food additive or food ingredient, that may be applied to a host to provide natural characteristics of a more fully-matured host (e.g., ripened on-the-plant) and/or an improved perception of those natural characteristics. The natural characteristics may include an improved taste, aroma/fragrance, moistness, vitamin/nutrient content, color, etc., or any combination thereof. The host may be processed (e.g., heated, cooked, reduced, etc.) or unprocessed (e.g., fresh, raw, etc.) and may include, for example, a tomato such as a sliced fresh whole or sectioned tomato, or tomato-based product, such as a pasta sauce.

Unlike other additives which may merely add a contrasting flavor to a host, or enhance faint traces of existing flavors and aromas in food, the perception-altering additive according to an exemplary embodiment of the present invention may provide additional flavor, aroma, color, nutrients, vitamins, and/or moisture, etc., or other characteristics inherent to the host that has been ripened-on-the-plant. In particular, the perception-altering additive of the present invention may provide, for example, an improved hearty taste, an aroma of fresh, natural garden scents, an increase in lycopene, vitamins, and nutrients, as well as a deeper, richer color, etc.

The perception-altering additive according to an exemplary embodiment of the present invention may provide a perception of virtually any natural characteristics indigenous to the host as if, for example, it were fully-ripened on a plant, vine, tree, root, etc. In particular, the perception-altering additive may include host-specific, host-like, and/or host-related components, such as an actual or associated host aroma or flavor including, for example, an aroma or flavor of the host itself or a plant, vine, leaf, stem, root, husk, trunk, bark, flower, greenery, foliage, bud, sap, seed, extract, etc. associated with the host. In this regard, the perception-altering additive may be adapted to add the actual or associated flavoring, aroma, and/or other host-specific, host-like, or host-related component(s) directly to the host.

The perception-altering additive may be applied to an unripe, under-ripe, or force-ripened host, or to a host in any other state of ripeness, to impart a perception of a maturation state of the unripe, under-ripe, or force-ripened host. In this manner, the unripe, under-ripe, or force-ripened host may taste, smell, and/or appear fresh, fresher, ripe, riper, etc. to a consumer, including, for example, as though the host had been fully ripened-on-the-plant. Accordingly, an increased demand for the unripe, under-ripe, or force-ripened host may be realized.

The perception-altering additive may be applied to a host having a non-uniform state of ripeness (e.g., partially ripe and partially unripe, or having ripened color but lacking fully developed flavor or aroma, etc.) to impart a perception of a balanced maturation or ripeness state of host and/or its natural characteristics. In this manner, the perception-altering additive may target a particular deficiency of the host without negatively impacting its overall state.

The perception-altering additive according to an exemplary embodiment of the present invention may be used to mass market fresh produce, such as fresh fruits and vegetables, after harvest and prior to shipment. Fresh produce with sacrificed flavor, aroma, color, moisture, and/or nutritional value due to pre-mature harvesting may particularly benefit from the application of the perception-altering additive.

The perception-altering additive according to an exemplary embodiment of the present invention may be applied to the fresh produce in a variety of media through a variety of application methods so that a constant, year-round stability and consistency in taste, aroma, color, moisture, vitamin, and/or nutritional value, etc. of the fresh produce or perception thereof may be maintained. Consequently, a market value of the fresh produce may be preserved despite the season. For example, citrus fruits such as oranges grown during the off-season may achieve a market value as though grown during the prime season.

The perception-altering additive according to an exemplary embodiment of the present invention may be applied, for example, to the flesh or pulpy part of the host including but not limited to sliced, diced, cut, chopped, cubed, crushed, minced, blended, pureed, pulverized, squashed, smashed, shredded, skinned, split, ground, and/or peeled host food products, etc. The perception-altering additive may be used on, in, and/or near the host food product, or in combination with other food products, or as a condiment, so that a wide variety of applied uses of the additive may be contemplated. In particular, the perception-altering additive may be used, for example, on host food products used in or on sandwiches, salads, sauces, salsa, hamburgers, garnishes, puree, paste, relish, ketchup, and host-based products including but not limited to host-based juices, host-based soups, host-based mixed cocktail drinks, host-based food additives, etc. In particular, the perception-altering additive may be used in tomato-based juices, tomato-based soups, tomato-based sauces, tomato-based mixed cocktail drinks, etc.

The perception-altering additive according to an exemplary embodiment of the present invention may be provided in a solid, semi-solid, liquid, semi-liquid, gaseous, and/or semi-gaseous form, or any combination thereof, including but not limited to an emulsion, suspension, solution, mixture, flakes, crystals, powder, granules, morsels, particles, dust, gel, glaze, marinade, paste, cream, foam, oil, dressing, syrup, mist, vapor, smoke, etc., and may be applied, for example, by sprinkling, dusting, pouring, squirting, spreading, spraying, saturating, misting, vaporizing, injecting, infusing, infiltrating, immersion, etc. In this manner, the perception-altering additive may be manufactured, delivered, and/or applied in a variety of media to a wide range of host products.

According to an exemplary embodiment of the present invention, the perception-altering additive may be provided in a sprinkle-on, dry, and/or solid form, such as, for example, in the form of flakes, crystals, powder, granules, morsels, particles, dust, etc. that may dissolve or react when applied to the host food product. In particular, the perception-altering additive may react with natural liquid juices of the host to release, impart, etc. additional flavor, aroma, color, nutrients, vitamins, other substances, etc. considered beneficial and/or desirable to human consumption, market value, etc.

According to an exemplary embodiment of the present invention, the perception-altering additive may be provided in a liquid or semi-liquid form that may be applied to the host food product, for example, via a spray, mist applicator, dropper, immersion, saturation, injection, infiltration, emulsion, suspension, poured, squirted, etc. Once applied, the perception-altering additive in liquid or semi-liquid form may saturate the host to release, impart, etc. the additional flavor, aroma, color, nutrients, vitamins, other substances, etc. considered beneficial and/or desirable to human consumption, market value, etc.

According to an exemplary embodiment of the present invention, the perception-altering additive may be provided in a gaseous or semi-gaseous form that may be applied to the host food product, for example, via injection, infusion, infiltration, vaporization, etc. Once applied, the perception-altering additive in gaseous or semi-gaseous form may permeate the host to release, impart, etc, the additional flavor, aroma, color, nutrients, vitamins, other substances, etc. considered beneficial and/or desirable to human consumption, market value, etc.

According to an exemplary embodiment of the present invention, the perception-altering additive may be applied to a fresh/raw tomato to impart a perception of a fully ripened-on-the-vine tomato having maximum desirable flavor, aroma, vitamins, nutrients, juice/moistness, and/or red color. For example, industrial application of the perception-altering additive to mass-market picked tomatoes, which may be semi-ripe, green in color, and/or lack flavor, aroma, vitamins, nutrients, and moisture, may facilitate the force-ripening process and/or a perception of fully ripened-on-the-vine tomatoes. Additionally, for example, consumer or after-market application of the perception-altering additive to force-ripened/ripened off-the-vine tomatoes offered to consumers in supermarkets and produce bins, which have a bland flavor, minimal aroma, a pale red color, and less vitamins, nutrients, and/or moisture, may provide an improved perception of vine-ripe flavor, aroma, ripe-red color, while replenishing vitamins, nutrients, and/or moisture. Hence, force-ripened/ripened-off-the-vine tomatoes at either the mass-market stage or the after-market stage may acquire an improved perception of a vine-ripened flavor, aroma, vitamins, nutrients, moisture, and red color.

According to an exemplary embodiment of the present invention an additive product may include a flavor component adapted to impart a flavor of an unprocessed host food product to the unprocessed host food product, and an aroma component adapted to impart an aroma of the unprocessed host food product to the unprocessed host food product.

The flavor component and/or the aroma component may be adapted for application to a non-skin portion of the host food product.

The flavor component and/or the aroma component may be adapted for application to a flesh portion of the host food product.

The additive product may further include a color component adapted to impart a color of the unprocessed host food product to the unprocessed host food product.

The additive product may further include a nutrient component adapted to impart a nutrient of the unprocessed host food product to the unprocessed host food product.

The nutrient may include lycopene.

The additive product may further include a vitamin component adapted to impart a vitamin of the unprocessed host food product to the unprocessed host food product.

The vitamin component may include ascorbic acid.

The additive product may further include a moisture component adapted to impart moisture to the unprocessed host food product.

The moisture component may include water.

The flavor component and/or the aroma component may be naturally-occurring in the unprocessed host food product or a natural origin of the unprocessed host food product.

The flavor component and/or the aroma component may include at least one spice.

The at least one spice may include at least one of garlic, pepper, and onion.

The flavor component and/or the aroma component may include at least one herb.

The at least one herb may include at least one of oregano and basil.

The unprocessed host food product may include one of an unprocessed tomato and an unprocessed tomato-based product.

The unprocessed host food product may include at least one of an unprocessed, unripe, under-ripe, and force-ripened tomato.

The unprocessed host food product may include a flesh portion of at least one an unprocessed, unripe, under-ripe, and force-ripened tomato.

The tomato-based product may include at least one of a sauce, a salsa, a paste, a puree, a garnish, a relish, a ketchup, a juice, a mixer, a liquid, a soup, and a beverage.

The additive product may be configured in at least one of a sprinkle-on, solid, semi-solid, liquid, semi-liquid, gel, glaze, gaseous, and semi-gaseous form.

According to another exemplary embodiment of the present invention, an additive product may include a flavor component adapted to impart a perceived flavor of an unprocessed host food product to the unprocessed host food product, and an aroma component adapted to impart a perceived aroma of the unprocessed host food product to the unprocessed host food product.

The perceived flavor of the unprocessed host food product may include a flavor of the unprocessed host food product in a ripened state.

The perceived aroma of the unprocessed host food product may include an aroma of the unprocessed host food product in a ripened state or a natural origin of the unprocessed host food product.

The additive product may be configured in at least one of a sprinkle-on, solid, semi-solid, liquid, semi-liquid, gel, glaze, gaseous, and semi-gaseous form.

An exemplary embodiment of a method to alter a characteristic of an unprocessed host food product may include applying a flavor component adapted to impart a flavor of the unprocessed host food product to the unprocessed host food product, and applying an aroma component adapted to impart an aroma of the unprocessed host food product to the unprocessed host food product.

The flavor component and/or the aroma component may be applied to a non-skin portion of the unprocessed host food product.

The flavor component and/or the aroma component may be applied to a flesh portion of the unprocessed host food product.

The method to alter a characteristic of an unprocessed host food product may further include applying a color component adapted to impart a color of the unprocessed host food product to the unprocessed host food product.

The method to alter a characteristic of an unprocessed host food product may further include applying a nutrient component adapted to impart a nutrient of the unprocessed host food product to the unprocessed host food product.

The nutrient may include lycopene.

The method to alter a characteristic of an unprocessed host food product may further include applying a vitamin component adapted to impart a vita of the unprocessed host food product to the unprocessed host food product.

The vitamin component may include ascorbic acid.

The method to alter a characteristic of an unprocessed host food product may further include applying a moisture component adapted to impart moisture to the unprocessed host food product to the unprocessed host food product.

The moisture component may include water.

The moisture component may include juice.

The flavor component and/or the aroma component may be naturally-occurring in the unprocessed host food product.

The flavor component and/or the aroma component may include at least one spice.

The at least one spice may include at least one of garlic, pepper, and onion.

The flavor component and/or the aroma component may include at least one herb.

The at least one herb may include at least one of oregano and basil.

The unprocessed host food product may include at least one of one an unprocessed tomato and an unprocessed tomato-based product.

The unprocessed host food product may include at least one of one an unripe, under-ripe, and force-ripened tomato.

The unprocessed host food product may include a non-skin portion of an unprocessed tomato.

The unprocessed host food product may include a flesh portion of an unprocessed tomato.

An exemplary embodiment of a method to alter a perceived characteristic of an unprocessed host food product may include applying a flavor component adapted to impart a perceived flavor of an unprocessed host food product to the unprocessed host food product, and applying an aroma component adapted to impart a perceived aroma of the unprocessed host food product to the unprocessed host food product.

The perceived flavor of the unprocessed host food product may include a flavor of the host food product in a ripened state.

The perceived aroma of the unprocessed host food product may include an aroma of the host food product in a ripened state.

An exemplary embodiment of a method to increase a market value of an unprocessed host food product may include acquiring the unprocessed host food product in at least one of an unripe, under-ripe, and force-ripened condition, applying a flavor component adapted to impart a flavor of the unprocessed host food product to the unprocessed host food product, and applying an aroma component adapted to impart an aroma of the unprocessed host food product or a natural origin of the unprocessed host food product to the unprocessed host food product.

The exemplary embodiment of the method to increase the market value of an unprocessed host food product may further include presenting the unprocessed host food product to a consumer or a potential consumer.

An exemplary embodiment of a method to increase a market value of an unprocessed host food product may include acquiring the unprocessed host food product in at least one of an unripe, under-ripe, and force-ripened condition, applying a flavor component adapted to impart a perceived flavor of the unprocessed host food product to the unprocessed host food product, and applying an aroma component adapted to impart a perceived aroma of the unprocessed host food product to the unprocessed host food product.

An exemplary embodiment of a method to increase a market value of an unprocessed tomato may include acquiring the unprocessed tomato in at least one of an unripe, under-ripe, and force-ripened condition, applying a flavor component adapted to impart a flavor of the unprocessed tomato to the unprocessed host food product, and applying an aroma component adapted to impart an aroma of the unprocessed tomato to the unprocessed host food product.

According to an exemplary embodiment of the present invention, a prepared food product may include an unprocessed host food product, a flavor component adapted to impart a flavor of the unprocessed host food product to the unprocessed host food product applied to the unprocessed host food product, and an aroma component adapted to impart an aroma component of the unprocessed host food product to the unprocessed host food product applied to the unprocessed host food product.

An exemplary embodiment of a method of the present invention may include, applying a flavor component adapted to impart a flavor of an unprocessed host food product to the unprocessed host food product, applying an aroma component adapted to impart an aroma of the unprocessed host food product to the unprocessed host food product, and preparing a prepared food product based on the unprocessed host food product after applying the flavor and aroma components.

The exemplary embodiment of a method of the present invention may further include acquiring the unprocessed host food product before applying the flavor and aroma components.

While reference is made above to a host food product in unripe, under-ripe, force-ripened, raw, and/or fresh states, it should be understood that the additive product according to the present invention may be configured for application to any host food product in a bland state, e.g., bland with respect to taste, aroma, flavor, fragrance, color, nutrient content, vitamin content, etc. Furthermore, in the method according to the present invention may be applicable to any host food product in a bland state, e.g., bland with respect to taste, aroma, flavor, fragrance, color, nutrient content, vitamin content, etc.

BRIEF DESCRIPTION OF THE DRAWINGS

FIG. 3B illustrates another exemplary method for increasing the market value for an unprocessed host food product.

DETAILED DESCRIPTION

Figure 1A:
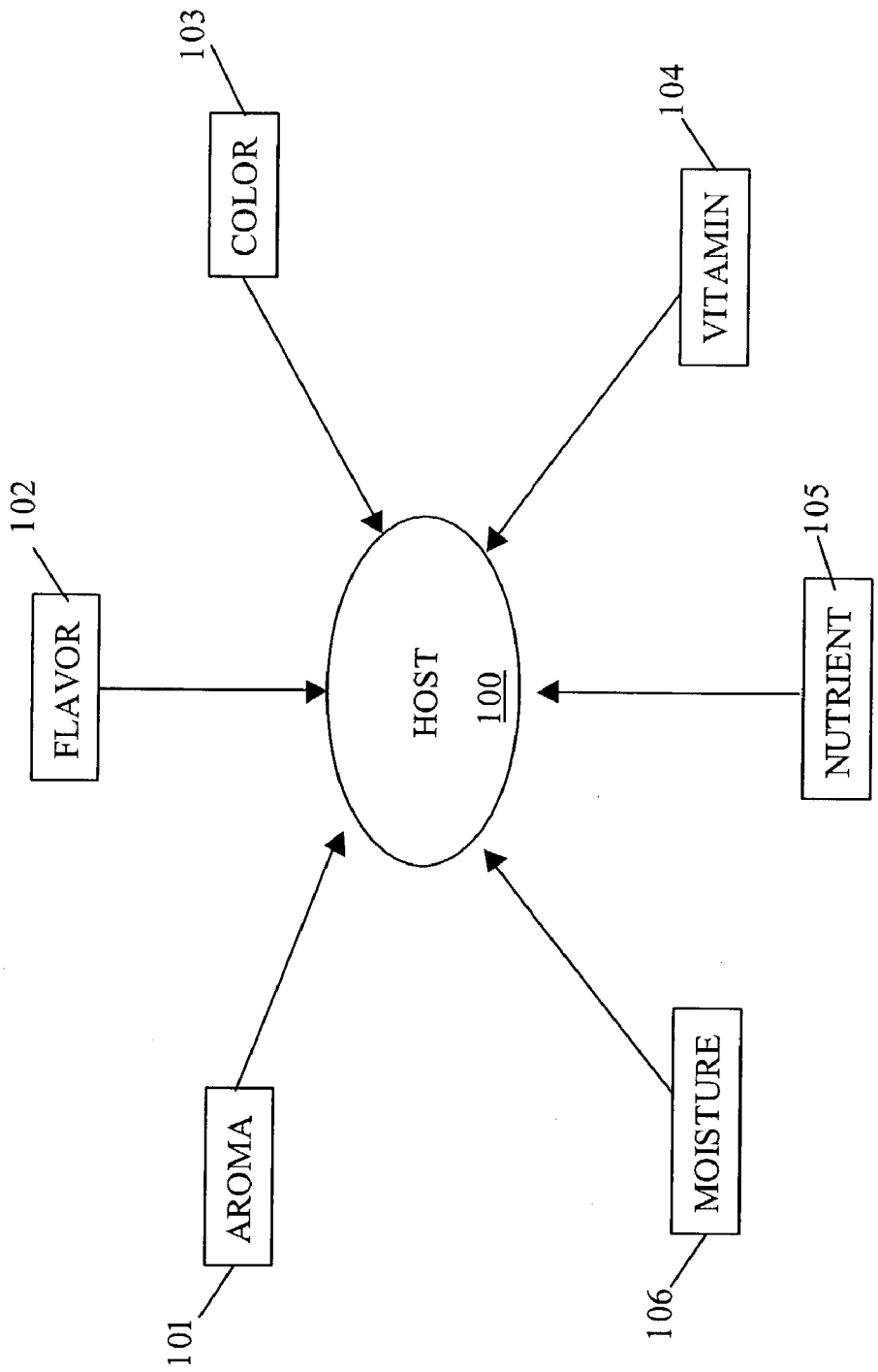
FIGS. 1A and 1B illustrate an exemplary method for altering a perception of a host food product.
Figure 1B:
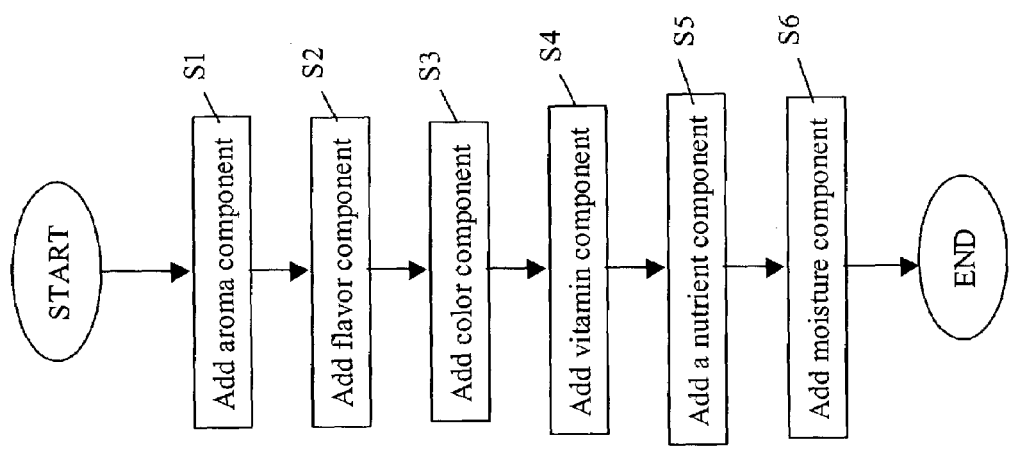

FIGS. 1A and 1B illustrate an exemplary method for altering a perception of a host food product 100. In step S1, aroma component(s) 101 are added to the host food product 100. In step S2, flavor component(s) are added to the host food product. In step S3, color component(s) 103 are added to the host food product 100. In step S4, a vitamin component 104 is added to the host food product 100. In step S5, a nutrient component 105 is added to the host food product 100. In step S6, a moisture component 106 is added to the host food product 100.

Steps S1 though S6 are not mandatory and may be performed in any order and in any combination. Thus, not all components 101 to 106 are required to achieve an altered perception of the host food product. A subset of the components 101 to 106 may be sufficient and/or desirable.

The altered perception may include that of a ripened and/or matured host food product, including, for example, a host food product ripened-on-the-plant. The host food product 100 may be processed, unprocessed, unripe, under-ripe, and/or force-ripened and may include, for example, a processed, unprocessed, unripe, under-ripe, and/or force-ripened tomato or a tomato-based product including an unprocessed, unripe, under-ripe, and/or force-ripened tomato. The tomato may include, for example, a tomato that is sliced, diced, cut, chopped, cubed, crushed, minced, blended, ground, pureed, pulverized, squashed, smashed, shredded, skinned and/or peeled, etc. The tomato-based product may include, for example, a sauce, a salsa, a paste, a puree, a garnish, a relish, a juice, a juice, a mixer, a drink, a liquid, a soup, a beverage, an additive, etc. In particular, the tomato-based product may include a pasta sauce, a chili sauce, a shrimp cocktail sauce, ketchup, a Bloody Mary mix, a tomato-based juice, a tomato-based soup, a tomato-based cocktail drink, a tomato-based food additive, etc.

The aroma, flavor, color, vitamin, nutrient, moisture components 101 to 106 may be naturally-occurring and may include, for example, host-specific, host-like, or host-related components. In particular, the aroma component 101 may include, for example, a tomato-aroma component or a component perceived to be a tomato-aroma component. In particular, the aroma component 101 may include an aroma of a vine-ripened tomato and/or tomato vine. The flavor component 102 may include, for example, a tomato-flavor component or a component perceived to be a tomato-flavor component. In particular, the flavor component 102 may include a flavor of a vine-ripened tomato and/or a tomato vine. The color component 103 may include, for example, a tomato-color component. In particular, the color component 103 may include a deep red color of a vine-ripened tomato. The vitamin component 104 may include, for example, vitamin C. The nutrient component 105 may include, for example, lycopene. The moisture component 106 may include, for example, water.

Figure 2A:
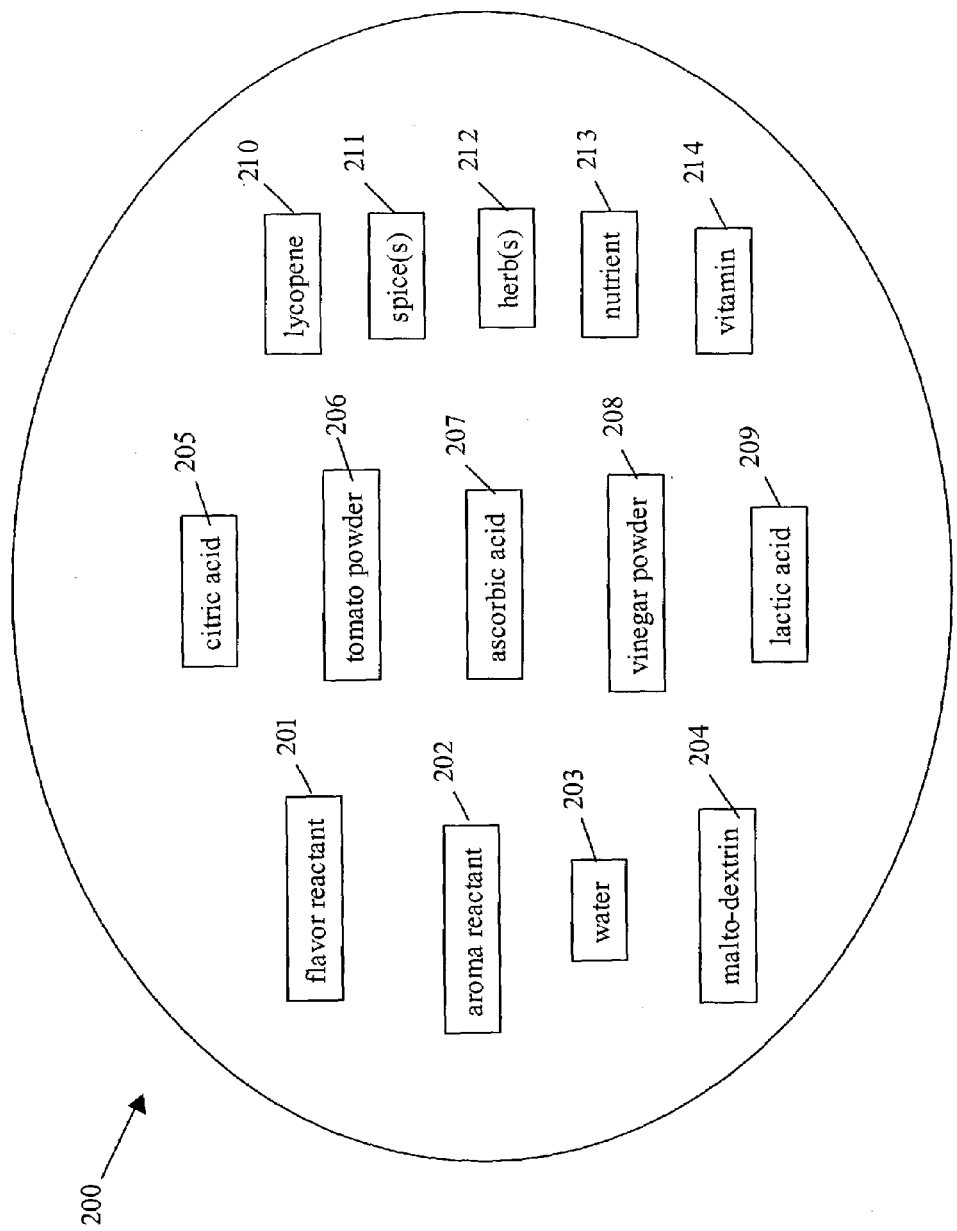
FIG. 2A illustrates exemplary additive components for altering the perception of a host food product.

FIG. 2A shows exemplary components 200 of a perception-altering additive including a flavor reactant 201, an aroma reactant 202, water 203, malto-dextrin 204, citric acid 205, tomato powder 206, ascorbic acid 207, vinegar powder 208, lactic acid 209, lycopene 210, spice(s) 211, herb(s) 212, a nutrient 213, and a vitamin 214. Not all components are required to achieve an altered perception so that any combination may be possible. Other components of the perception-altering additive may be provided as well.

Figure 2B:
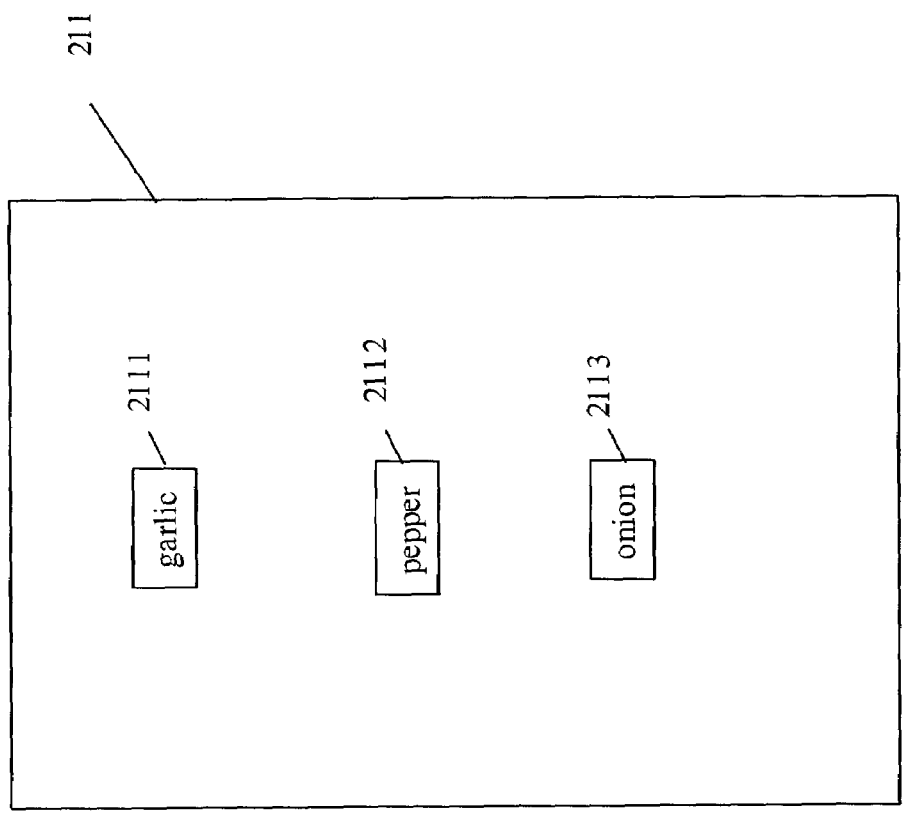
FIG. 2B illustrates exemplary components of a spice component.

FIG. 2B shows exemplary components of the spice(s) 211 including garlic 2111, pepper 2112, and onion 2114. Not all components are required to achieve an altered perception so that any combination may be possible. Other components of the spice(s) 211 may be alternatively or additionally provided.

Figure 2C:
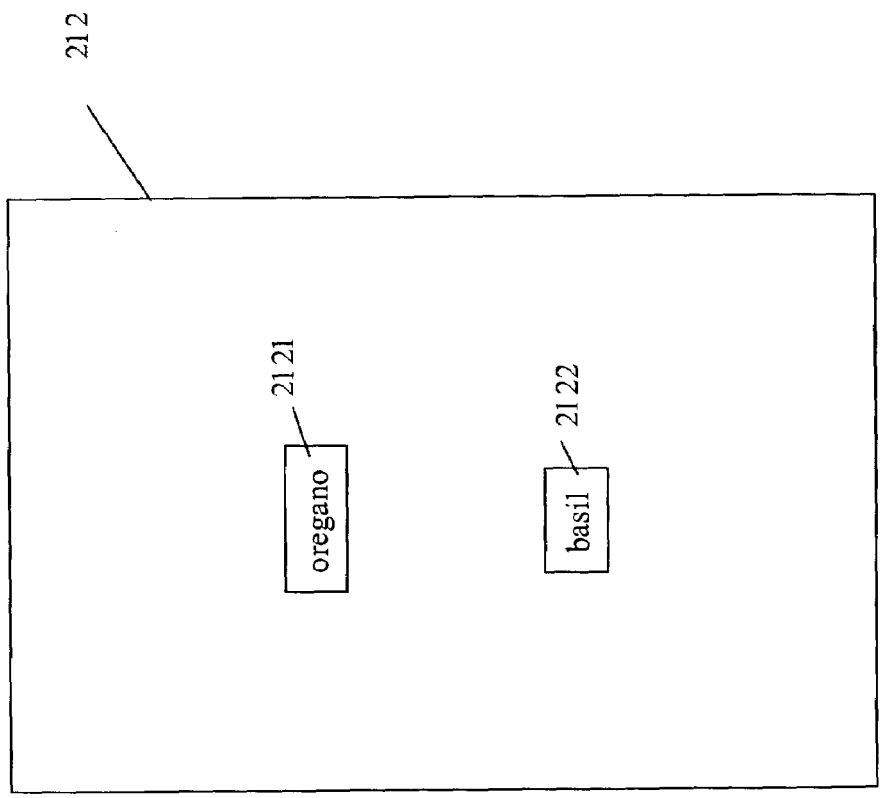
FIG. 2C illustrates exemplary components of a herb component.

FIG. 2C illustrates exemplary components of the herb(s) 212 including oregano 2121 and basil 2122. Not all components are required to achieve an altered perception so that any combination may be possible. Other components of the herb(s) 212 may be alternatively or additionally provided.

The perception-altering additive may be applied to the flesh or pulpy part of the host including but not limited to sliced, diced, cut, chopped, cubed, crushed, minced, blended, grinded, pureed, pulverized, squashed, smashed, shredded, skinned, split, grinded, and/or peeled host food products. The perception-altering additive may be used, for example, on host food products used in sandwiches, salads, salsa, hamburgers, garnishes, puree, relish, ketchup, and host-based products including but not limited to host-based juices, host-based soups, host-based mixed cocktail drinks, host-based food additives, etc.

The perception-altering additive may be provided in a solid, semi-solid, liquid, semi-liquid, gaseous, and/or semi-gaseous form including but not limited to an emulsion, suspension, solution, mixture, flakes, crystals, powder, granules, morsels, particles, dust, gel, glaze, marinade, paste, cream, foam, oil, dressing, syrup, mist, vapor, smoke, etc., and may be applied, for example, by sprinkling, dusting, pouring, squirting, spreading, spraying, saturating, misting, vaporizing, injecting, infusing, infiltrating, immersion, etc. In this manner, the perception-altering additive may be manufactured, delivered, and/or applied in a variety of media to a wide range of host products.

The perception-altering additive may be provided in a sprinkle-on, dry, and/or solid form, such as, for example, in the form of flakes, crystals, powder, granules, morsels, particles, dust, etc. In particular, the perception-altering additive may be adapted to or react with natural liquid juices of the host to release additional flavor, aroma, color, nutrients, vitamins, or other characteristics considered beneficial and/or desirable to human consumption, market value, etc.

The perception-altering additive may also be provided in liquid or semi-liquid form. Once applied, the perception-altering additive in liquid or semi-liquid form may saturate the host to provide the additional flavor, aroma, color, nutrients, vitamins, other characteristics considered beneficial and/or desirable to human consumption, market value, etc.

The perception-altering additive may also be provided in a gaseous or semi-gaseous form that may be applied to the host food product, for example, via injection, infusion, infiltration, vaporization, etc. Once applied, the perception-altering additive in gaseous or semi-gaseous form may permeate the host to release, impart etc, the additional flavor, aroma, color, nutrients, vitamins, other substances, etc. considered beneficial and/or desirable to human consumption, market value, etc.

The perception-altering additive may increase a market value for an unripe, under-ripe, or force-ripened host food product. In particular, the application of the perception-altering additive may provide an increase in demand for the unripe, under-ripe, or force-ripened host food product which may be presented to a consumer or a potential consumer (e.g., offering, displaying, providing the host food product, e.g., for sale or consumption). The presenting may include incorporating the host food product into a prepared food product. If the host food product is a tomato, for example, the presenting may include incorporating the tomato into a salad, sandwich, etc., or providing, selling, offering for sale, etc, a prepared food product incorporating the tomato.

Figure 3A:
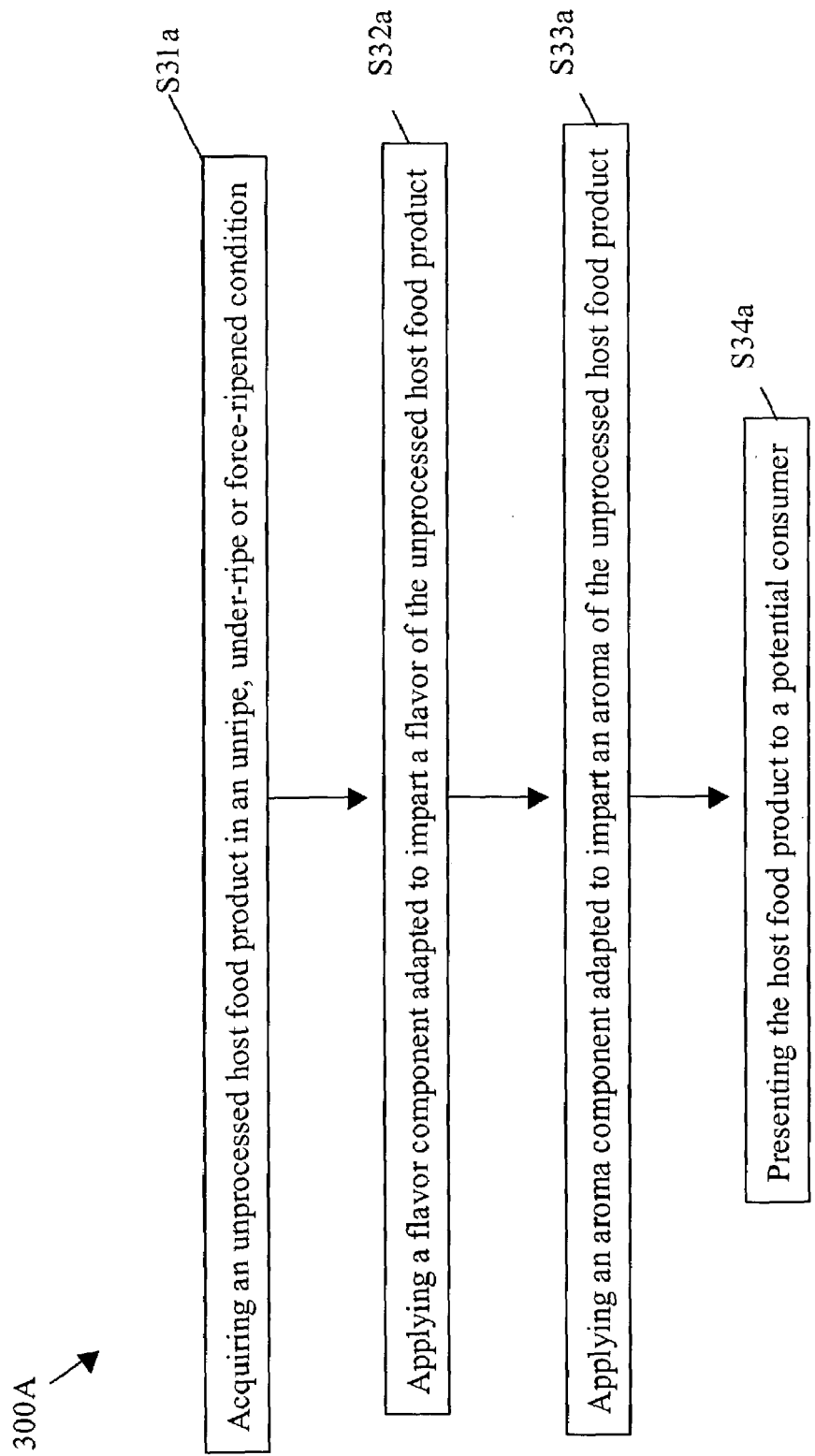
FIG. 3A illustrates an exemplary method for increasing the market value for an unprocessed host food product.

FIG. 3A illustrates an exemplary method 300A for increasing a market value for an unprocessed host food product. In step S31a, the unprocessed host food product is acquired in an unripe, under-ripe, or force-ripened condition. In step S32a, a flavor component adapted to impart a flavor of the unprocessed host food product is applied to the unprocessed host food product. In step S33a, an aroma component adapted to impart an aroma of the unprocessed host food product is applied to the unprocessed host food product. The flavor and/or aroma component may be applied in a sprinkle-on, solid, semi-solid, liquid, semi-liquid, gel, glaze, gaseous, and/or semi-gaseous form. In step S34a, the unprocessed host food product is presented to a consumer or a potential consumer.

FIG. 3B illustrates another exemplary method 300B for increasing a market value for an unprocessed host food product. In step S31b, the unprocessed host food product is acquired in an unripe, under-ripe, or force-ripened condition. In step S32b, a flavor component adapted to impart a perceived flavor of the unprocessed host food product is applied to the unprocessed host food product. In step S33b, an aroma component adapted to impart a perceived aroma of the unprocessed host food product is applied to the unprocessed host food product. The flavor and/or aroma component may be applied in a sprinkle-on, solid, semi-solid, liquid, semi-liquid, gel, glaze, gaseous, and/or semi-gaseous form. In step S34b, the unprocessed host food product is presented to a consumer or a potential consumer.

Figure 3C:
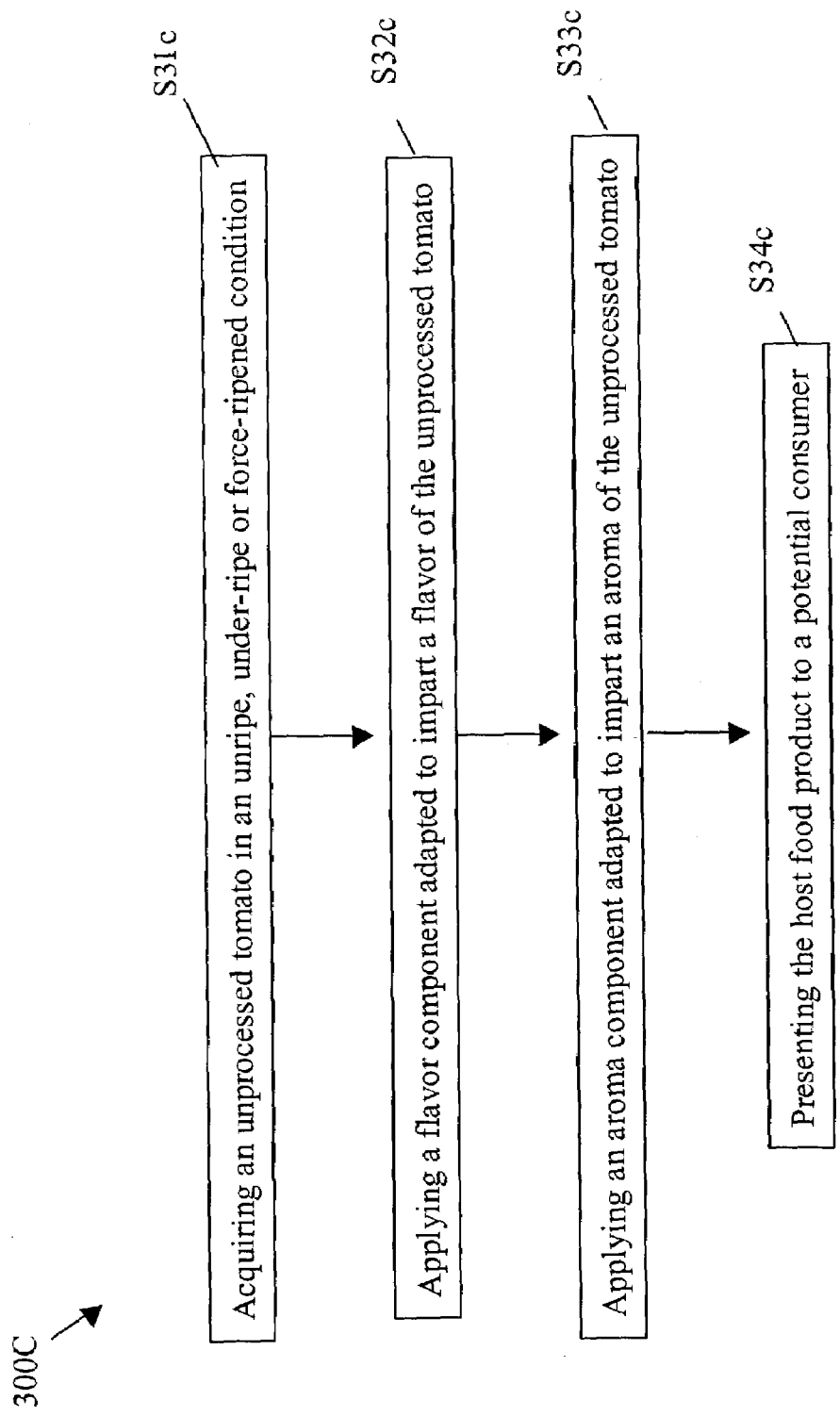
FIG. 3C illustrates an exemplary method for increasing the market value for an unprocessed tomato.

FIG. 3C illustrates an exemplary method 300C for increasing a market value for an unprocessed tomato. In step S31c, the unprocessed tomato is acquired in an unripe, under-ripe, or force-ripened condition. In step S32c, a flavor component adapted to impart a flavor of the unprocessed tomato is applied to the unprocessed tomato. In step S33a, an aroma component adapted to impart an aroma of the unprocessed tomato is applied to the unprocessed tomato. The flavor and/or aroma component may be applied in a sprinkle-on, solid, semi-solid, liquid, semi-liquid, gel, glaze, gaseous, and/or semi-gaseous form. In step S34c, the unprocessed host food product is presented to a consumer or a potential consumer.

What is claimed is:

1. An additive product, comprising:
   a flavor component adapted to impart a flavor of at least one of an unprocessed fruit or vegetable and a natural origin of the unprocessed fruit or vegetable to the unprocessed fruit or vegetable to a perceived level equal to a level naturally occurring in a fully-ripe state of the unprocessed fruit or vegetable; and
   an aroma component adapted to impart an aroma of at least one of the unprocessed fruit or vegetable and a natural origin of the unprocessed fruit or vegetable to the unprocessed fruit or vegetable to a perceived level equal to a level of the aroma naturally occurring in a fully-ripe state of the unprocessed fruit or vegetable.

2. The additive product according to claim 1, wherein at least one of the flavor component and the aroma component is adapted for application to a non-skin portion of the unprocessed fruit or vegetable.

3. The additive product according to claim 2, wherein the at least one of the flavor component and the aroma component is adapted for application to a flesh portion of the unprocessed fruit or vegetable.

4. The additive product according to claim 1, further comprising:
   a color component adapted to impart a color of the unprocessed fruit or vegetable to the unprocessed fruit or vegetable.

5. The additive product according to claim 1, further comprising:
   a nutrient component adapted to impart a nutrient of the unprocessed fruit or vegetable to the unprocessed fruit or vegetable.

6. The additive product according to claim 5, wherein the nutrient includes lycopene.

7. The additive product according to claim 1, further comprising:
   a vitamin component adapted to impart a vitamin of the unprocessed fruit or vegetable to the unprocessed fruit or vegetable.

8. The additive product according to claim 7, wherein the vitamin component includes ascorbic acid.

9. The additive product according to claim 1, further comprising:
   a moisture component adapted to impart moisture to the unprocessed fruit or vegetable.

10. The additive product according to claim 9, wherein the moisture component includes water.

11. The additive product according to claim 1, wherein at least one of the flavor component and the aroma component is naturally-occurring in at least one of the unprocessed fruit or vegetable and the natural origin of the unprocessed fruit or vegetable.

12. The additive product according to claim 1, wherein at least one of the flavor component and the aroma component includes at least one spice.

13. The additive product according to claim 12, wherein the at least one spice includes at least one of garlic, pepper, and onion.

14. The additive product according to claim 1, wherein at least one of the flavor component and the aroma component includes at least one herb.

15. The additive product according to claim 14, wherein the at least one herb includes at least one of oregano and basil.

16. The additive product according to claim 1, wherein the unprocessed fruit or vegetable includes one of an unprocessed tomato and an unprocessed-tomato-based product.

17. The additive product according to claim 1, wherein the unprocessed fruit or vegetable includes at least one of an unprocessed, unripe, under-ripe, and force-ripened tomato.

18. The additive product according to claim 1, wherein the unprocessed fruit or vegetable includes a flesh portion of at least one of an unprocessed, unripe, under-ripe, and force-ripened tomato.

19. The additive product according to claim 16, wherein the tomato-based product includes at least one of a sauce, a salsa, a paste, a puree, a garnish, a relish, a juice, a mixer, a liquid, a soup, and a beverage.

20. The additive product according to claim 1, wherein the additive product is configured in at least one of a sprinkle-on, solid, semi-solid, liquid, semi-liquid, gel, glaze, gaseous, and semi-gaseous form.

21. An additive product, comprising:
a flavor component adapted to impart a perceived flavor of at least one of an unprocessed fruit or vegetable and a natural origin of the unprocessed fruit or vegetable to the unprocessed fruit or vegetable to a level equal to a level naturally occurring in a fully-ripe state of the unprocessed fruit or vegetable; and
an aroma component adapted to impart a perceived aroma of at least one of the unprocessed fruit or vegetable and the natural origin of the unprocessed fruit or vegetable to the unprocessed fruit or vegetable to a level equal to a level naturally occurring in a fully-ripe state of the unprocessed fruit or vegetable.

22. The additive product according to claim 21, wherein the perceived flavor of the unprocessed fruit or vegetable includes a flavor of the unprocessed fruit or vegetable in a ripened state.

23. The additive product according to claim 21, wherein the perceived aroma of the unprocessed fruit or vegetable includes an aroma of at least one of the unprocessed fruit or vegetable in a ripened state and the natural origin of the unprocessed fruit or vegetable.

24. The additive product according to claim 21, wherein the additive product is configured in at least one of a sprinkle-on, solid, semi-solid, liquid, semi-liquid, gel, glaze, gaseous, and semi-gaseous form.

25. A prepared food product, comprising:
an unprocessed fruit or vegetable;
a flavor component adapted to impart a flavor of at least one of the unprocessed fruit or vegetable and a natural origin of the unprocessed fruit or vegetable to the unprocessed fruit or vegetable to a perceived level equal to a level naturally occurring in a fully-ripe state of the unprocessed fruit or vegetable, the flavor component applied to the unprocessed fruit or vegetable; and
an aroma component adapted to impart an aroma of at least one of the unprocessed fruit or vegetable and a natural origin of the unprocessed fruit or vegetable to the unprocessed fruit or vegetable to a perceived level equal to a level naturally occurring in a fully-ripe state of the unprocessed fruit or vegetable, the aroma component applied to the unprocessed fruit or vegetable.

26. An additive product, comprising:
a flavor component adapted to impart at least one of a flavor and a perceived flavor of at least one of an unprocessed tomato and a natural origin of the unprocessed tomato to a level equal to a level naturally occurring in a fully-ripe state of the unprocessed tomato; and
an aroma component adapted to impart at least one of an aroma and a perceived aroma of at least one of the unprocessed tomato and the natural origin of the unprocessed tomato to a level equal to a level naturally occurring in a fully-ripe state of the unprocessed tomato.

27. A prepared food product, comprising:
an unprocessed tomato;
a flavor component adapted to impart at least one of a flavor and a perceived flavor of at least one of the unprocessed tomato and a natural origin of the unprocessed tomato to the unprocessed tomato to a level equal to a level naturally occurring in a fully-ripe state of the unprocessed tomato, the flavor component applied to the unprocessed tomato; and
an aroma component adapted to impart an aroma of at least one of the unprocessed tomato and a natural origin of the unprocessed tomato to the unprocessed tomato to a level equal to a level naturally occurring in a fully-ripe state of the unprocessed tomato, the aroma component applied to the unprocessed tomato.

28. An additive product, comprising:
a flavor component adapted to impart a flavor of an unprocessed tomato to an unprocessed tomato to a level equal to a level naturally occurring in a fully-ripe state of the unprocessed tomato; and
an aroma component adapted to impart an aroma of the unprocessed tomato to the unprocessed tomato to a level equal to a level naturally occurring in a fully-ripe state of the unprocessed tomato.

29. A prepared food product, comprising:
an unprocessed tomato;
a flavor component adapted to impart a flavor of the unprocessed tomato to the unprocessed tomato to a level equal to a level naturally occurring in a fully-ripe state of the unprocessed tomato, the flavor component applied to the unprocessed tomato; and
an aroma component adapted to impart an aroma of the unprocessed tomato to the unprocessed tomato to a level equal to a level naturally occurring in a fully-ripe state of the unprocessed tomato, the aroma component applied to the unprocessed tomato.

30. The additive product according to claim 1, wherein the additive product is configured in at least one of a sprinkle-on dry form and a sprinkle-on crystal form.

* * * * *